United States Patent [19]
Kashino

[11] Patent Number: 5,244,245
[45] Date of Patent: Sep. 14, 1993

[54] VEHICLE TOP COVER

[76] Inventor: Mark Kashino, 418 N. River St., Box Box 925, Hailey, Id. 83333

[21] Appl. No.: 952,676

[22] Filed: Sep. 25, 1992

[51] Int. Cl.$^5$ .............................................. B60J 11/00
[52] U.S. Cl. .................................................... 296/136
[58] Field of Search ........................ 296/136; 150/166

[56] References Cited

U.S. PATENT DOCUMENTS

| | | | |
|---|---|---|---|
| 3,021,894 | 2/1962 | La Due | 160/23 |
| 3,338,293 | 8/1967 | Hohmann | 160/368 |
| 4,795,207 | 1/1989 | Clarke | 296/136 |
| 4,799,728 | 1/1989 | Akers et al. | 296/136 |
| 4,842,324 | 6/1989 | Carden | 296/136 |
| 4,863,210 | 9/1989 | Kenon | 296/136 |
| 4,940,276 | 7/1990 | Madison | 296/136 |
| 4,948,191 | 8/1990 | Cao | 296/136 |
| 5,029,933 | 7/1991 | Gillem | 296/126 |
| 5,042,836 | 8/1991 | Swanson | 280/770 |

FOREIGN PATENT DOCUMENTS 674216  11/1963  Canada .................. 296/88

*Primary Examiner*—Robert R. Song
*Attorney, Agent, or Firm*—Frank J. Dykas; Craig M. Korfanta; Ken J. Pedersen

[57] ABSTRACT

Embodiments of a vehicle top cover are shown and described, each having a roof panel and two flexible side panels that form a vehicle-top shape and a means for holding down the rear of the vehicle top cover on the vehicle. The roof panel covers most of the front window, roof, and back window, and is held down on the front window by the windshield wipers or, optionally, is tied to the wipers. The side panels extend from the roof panel and are shut in the vehicle doors to secure the cover to the vehicle and to hang down inside the vehicle interior along the inside of the side windows. The rear edge of the vehicle top cover may be held down by a flap or a weighted flap that is shut in the trunk or by a weight attached to the rear edge of the vehicle top cover that lies on the outside of the vehicle. The flap may also be a stuff bag which is turned inside out and stuffed with the roof panels and side panels for storage.

8 Claims, 6 Drawing Sheets

VEHICLE TOP COVER

BACKGROUND OF THE INVENTION

1. Technical Field

This invention relates generally to vehicle accessories and, more specifically, to window shades and protective covers for vehicles.

2. Background Art

Portable protective covers have been designed to shield vehicles from weather and sunshine. A common style is a foldable cardboard visor that can be positioned inside the front window to block sun from shining into the vehicle interior through the front window. Another common style is an all-over canvas or cloth sheet that covers an entire vehicle down to the tires and is held on by elastic or a drawstring. Such a cover is disclosed in Clarke, U.S. Pat. No. 4,795,207. It is made from a central panel and two side panels that are sewn together and held on the vehicle by an elastic band that gathers the bottom of the cover around the bottom of the bumper and rocker panels.

Kenon, U.S. Pat. No. 4,863,210 discloses a cover that lies on the outside of the windows and roof to cover the top half of a vehicle. It is held on by snap devices mounted to the vehicle body and internal flaps that are attached to the underside of the cover for shutting in the driver and front passenger side doors. Renwick, Canadian Patent 674,216, discloses a sheet that covers a vehicle front window and is held on by magnets and tie-means that are closed in the front doors of the vehicle.

Gillem. U.S. Pat. No. 5,029,933, discloses a vehicle cover that lies on the outside of the vehicle and is held on by a strap that envelopes the front end of the car and by straps that hook onto the trunk hinges.

What is still needed is a window shade and protective cover that covers a vehicle's roof and all its windows, that is tightly attached for security and privacy, and yet is also light-weight and compact.

DISCLOSURE OF INVENTION

This invention is a vehicle top cover made from a roof panel and two side panels that are sized and connected to create a vehicle-top shaped fabric covering. The roof panel is sized to extend to the bottom of the vehicle front windows and to fit under the windshield wipers. The roof panel is also sized to extend toward the back of the vehicle and down to the bottom of the vehicle rear window. The side panels are closed between the vehicle door frames and the doors so that they hang substantially inside the vehicle on the inside of, and down to the bottom of, the side windows. The roof panel and side panels are sized so that the seams between them lie on top of the vehicle roof and away from the doors, so that the seams do not interfere with, and are not shut in, the doors.

The cover is held down on the front windshield by the windshield wipers, or optionally, is secured by tie-means that attach the cover to the wipers. The cover is secured on the rear of the vehicle by a flap that is shut in the trunk or by a weight attached to the cover by an attachment means. The flap also may be weighted and may optionally lie on top of the trunk or hang down on the outside of the vehicle instead of being shut in the trunk. The flap may be a stuff bag that can be turned inside out and stuffed with the cover for neat and convenient storage.

The invention is simple and inexpensive to construct and use and can be installed on a vehicle without any modifications to the vehicle. The invention can be very securely installed on the vehicle because the side panels are closed in the vehicle doors and are liftable from the vehicle inside but not the outside, and because the rear flap is shut in the trunk. The invention protects the vehicle's interior from the harmful effects of the sun, keeps the vehicle cool, shields the vehicle's contents from casual observation, and keeps the windows free of snow, ice, fog or ocean haze which may settle while the vehicle is parked. The invention extends the life of vinyl or convertible vehicle tops. The invention conceals the entire vehicle interior, yet can be lifted from within the vehicle to see outside, providing security and privacy for persons resting in the vehicle. The invention covers the vehicle roof and windows, but extends down only as far as the window bottoms, making the cover small, light-weight, and easy to install on the vehicle and to handle and carry.

BEST MODE FOR CARRYING OUT INVENTION

Figure 1A:
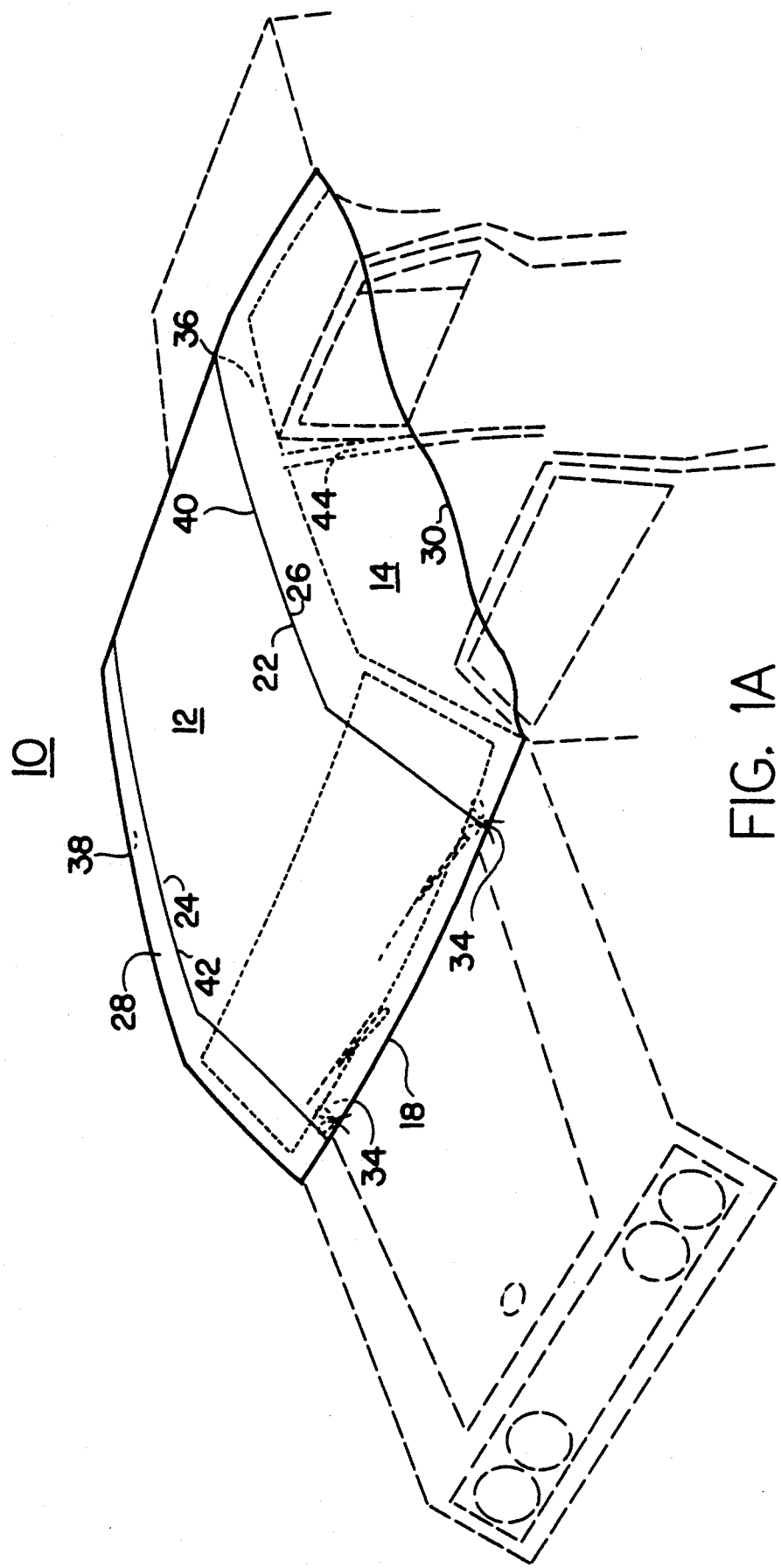
FIG. 1A is a front perspective view of one embodiment of the invention lying on a car top, with the car doors open in preparation for securing or removing the invention.
Figure 1B:
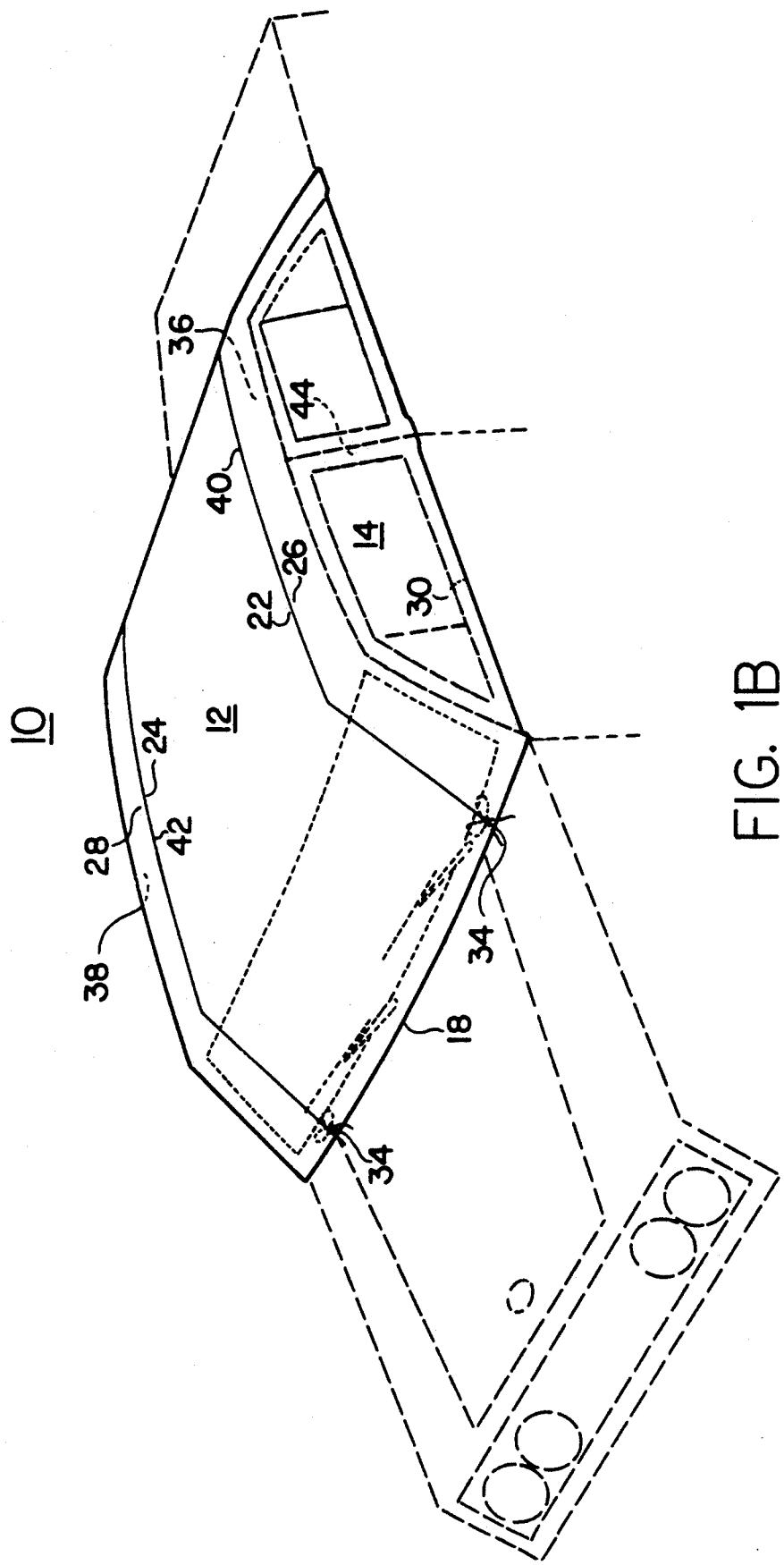
FIG. 1B is a front perspective view of the embodiment of FIG. 1A, with the car doors closed over the side panels of the invention.
Figure 1C:
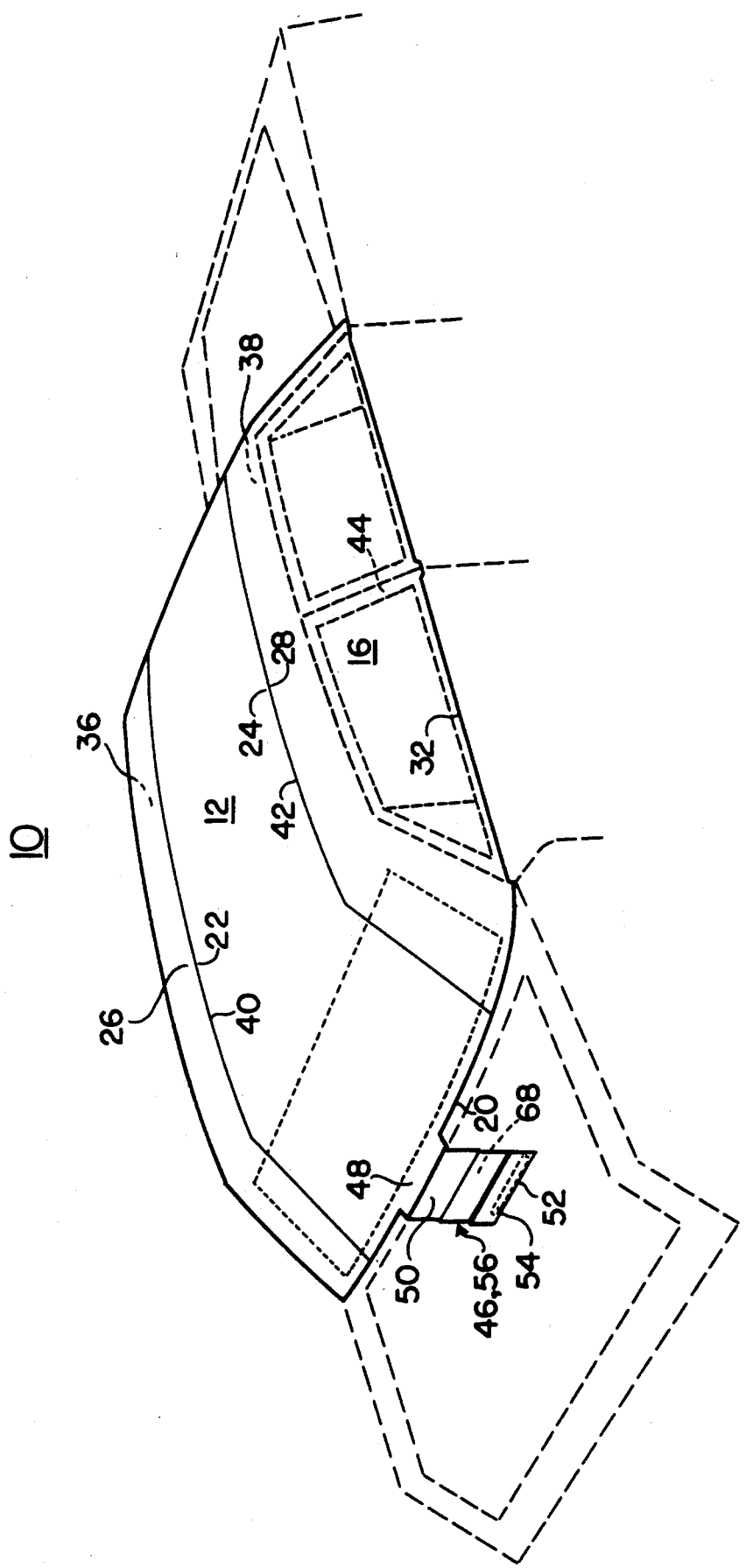
FIG. 1C is a back perspective view of the embodiment of FIG. 1A and 1B, showing the stuff bag closed in the car trunk.
Figure 2:
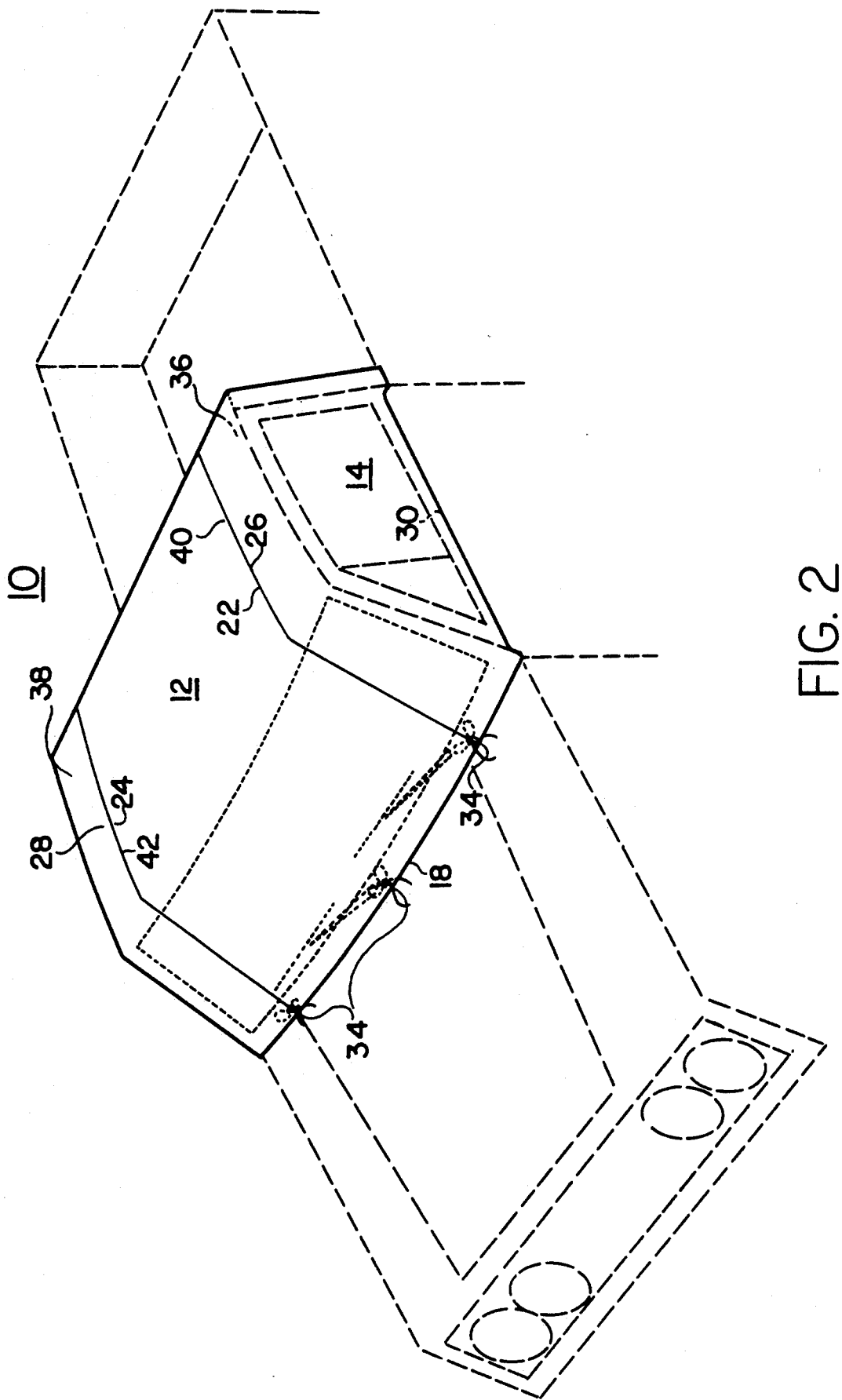
FIG. 2 is a front perspective view of an embodiment of the invention for a pickup truck top.
Figure 3:
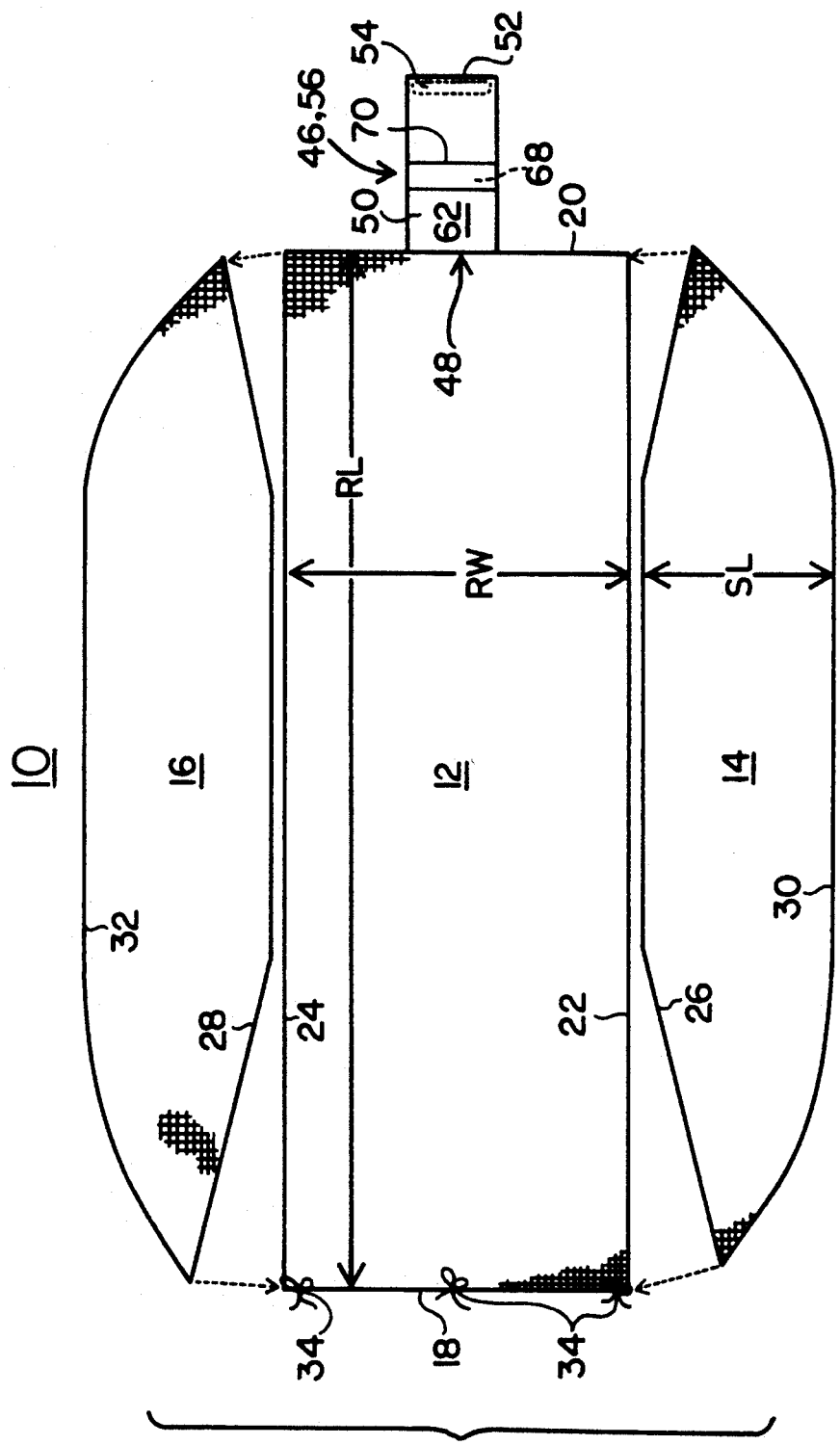
FIG. 3 is a top view of one embodiment of the invention, showing the three panels, flattened out before connection to each other, and showing the stuff bag.

Referring to FIGS. 1-4, there are shown some, but not all, embodiments of the vehicle top cover 10. The vehicle top cover 10 comprises a roof panel 12 and two side panels 14 and 16 that are normally, but are not required to be, mirror images of each other. These three panels 12, 14 and 16 are joined together to form a vehicle-top shaped fabric shell that fits on the top of a vehicle. The roof panel 12 is rectangular in shape, with a front edge 18, rear edge 20, and two side edges 22 and 24. The side panels 14 and 16 each have a seam edge 26 and 28 and a hanging edge 30 and 32. The seam edges 26 and 28 are cut in a curved shape that approximately matches the contour of the vehicle top for which the vehicle top cover 10 is intended. When the seam edges 26 and 28 are sewn, waterproof glued, or otherwise attached to the side edges 22 and 24 of the roof panel 12, the vehicle top cover 10 takes the shape of the vehicle top. FIG. 3 shows the seam edge 26 and 28 curve that is appropriate for a typical sedan automobile, as shown in FIGS. 1A, 1B and 1C. The vehicle top cover 10 embodiment in FIG. 2 for a pickup truck has a sharper angle of curve on the seam edges 26 and 28.

The roof panel length RL is sized so that, when the vehicle top cover 10 is installed on a vehicle top, the front edge 18 extends to the bottom of the front window and can be placed under the windshield wipers to prevent wind from raising the front edge 18. Optionally, tie means 34 are attached to the front edge 18 and positioned to be tied around the wiper bases for extra permanence and security of installation. The roof panel 12 is also sized to extend back to the rear of the vehicle so that the rear edge 20 reaches the bottom of the rear window. The roof panel length RL does not have to be an exact fit, but is preferably in a range that covers most of the length of the front and back windows and reaches far enough on the front window to be held down by the wipers 33.

The roof panel width RW is sized to be narrower than the width of the vehicle roof, so that the roof panel 12 extends toward but doesn't reach or hang over the shoulders 36 and 38 of the roof. The side panels 14 and 16 are attached to the roof panel 12 side edges 22 and 24 and hang over the shoulders 36 and 38 and down to lie between, and to be shut or closed between, the doors and the door frames. This keeps the seams 40 and 42 away from the doors so the seams 40 and 42 do not interfere with and are not damaged by the closing of the doors and so that the seams 40 and 42 do not crease the weatherproofing strips between the door and the door frames.

The side panels 14 and 16 are sized to extend from the side edges 22 and 24 of the roof panel 12 down to the bottom of the side windows when the side panels 14 and 16 are closed behind the doors. The side panel length SL should be long enough to cover most of the side windows for privacy and sun shielding, but short enough that the hanging edges 30 and 32 do not interfere with the door hinges or latches. For a typical mid-sized automobile, the side panel length SL is approximately 26 inches at the center and tapers to shorter lengths at each end to form an even bottom line with the front edge 18 and the rear edge 20. For a mid-sized automobile, the dimensions of the roof panel 12 are approximately 9 feet, 4 inches long RL and 3 feet wide RW. These dimensions and the curve of the side panel seam edges 26 and 28 and hanging edges 30 and 32 can be adjusted to fit subcompact cars, large cars, trucks, vans, station wagons, hatchbacks, 4-wheel drive vehicles and sports cars.

When closed behind the doors, the side panels 14 and 16 lie mostly inside the vehicle interior. In the case where the vehicle top cover 10 is used on a 4-door vehicle, the side panels 14 and 16 bend around the roof pillars 44. The inside-the-vehicle design for the side panels 14 and 16 ensures that the vehicle top cover 10 is tightly and securely fastened to the car, especially if the doors are locked. This design also helps prevent passers-by from lifting up the vehicle top cover 10 to peer inside the vehicle. Passers-by cannot lift up the side panels 14 and 16 and find it difficult to lift up the front edge 18 and rear edge 20 because of the side panels 14 and 16 hold the roof panel 12 down and tight across the front and rear windows. The inside-the-vehicle side panel 14 and 16 design allows people resting in the parked vehicle to raise the side panels 14 and 16 enough to peek out. Optionally, in the case of a 4-door automobile, the side panels 14 and 16 may be closed in just the driver's and front passenger's windows, rather than all four side windows.

The vehicle top cover 10 also includes a flap 46, which is attached at or near the rear edge 20 of the roof panel 12. The flap 46 extends from the rear edge 20 and is of a length, flatness, and flexibility that allows it to extend between, and be closed between, the trunk lid and the lid frame. This securely holds the rear edge 20 of the roof panel 12 in place so that wind or people cannot lift the rear edge 20 without damaging the vehicle top cover 10 or the vehicle. Preferably, the first end 48 of the flap 46 is attached to the roof panel 12, the center 50 of the flap 46 bends to pass between the trunk lid and lid frame, and the second end 52 of the flap 46 hangs inside the trunk interior. Optionally, a weight 54 may be attached to the second end 52 of the flap 46. This weight 54 helps pull the flap 46 into the trunk interior and hangs in the trunk interior to keep the flap 46 in place until the trunk lid is closed. The weight 54 also allows the flap 46 to be used to hold down the rear edge 20 on a vehicle, even when the flap 46 is not shut inside the trunk interior. For example, when a person wants only temporary or quick installation of the vehicle top cover 10, he or she may simply lay the flap 46 with the weight 54 on top of the trunk lid. Also, the flap 46 with the weight 54 hangs on the outside of the back of a pickup truck cab, because there is normally no trunk there in which to close the flap 46.

Figures 4A, 4B:
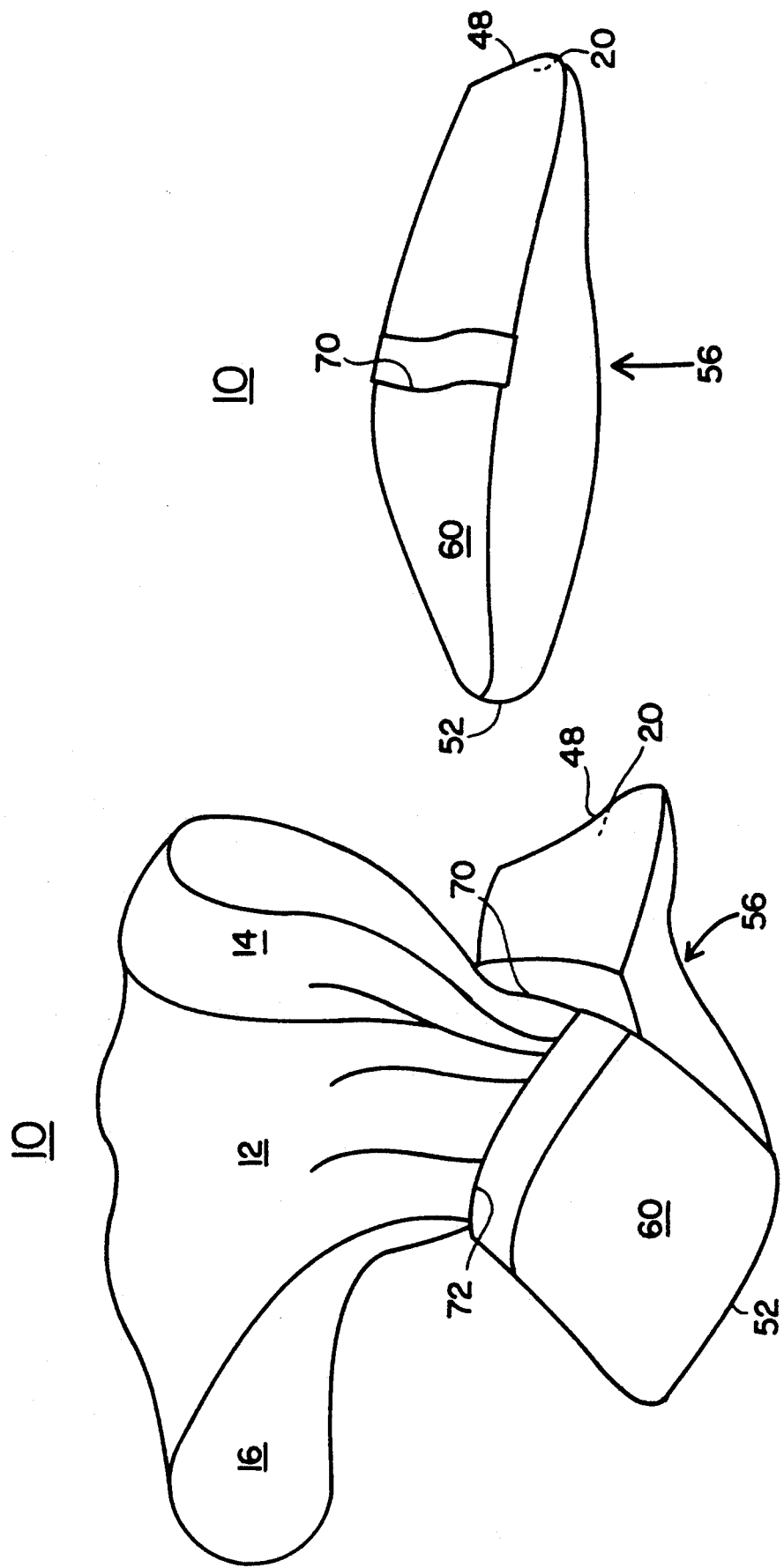
FIG. 4A is a perspective view of one embodiment of the invention being stuffed into the stuff bag.
FIG. 4B is a perspective view of the embodiment of the invention of FIG. 4A after it is stuffed into the stuff bag.

The preferred embodiment of the flap 46 is a stuff bag 56 as shown in FIGS. 3, 4A and 4B. The stuff bag 56 is an enclosure wall having an interior surface 60, an exterior surface 62, a first end and a second end which act as the first end 48 and second end 52 of the flap 46, and an opening 68. The exterior surface 62 of the stuff bag 50 first end 48 is attached to the roof panel 12 rear edge 20. The stuff bag 56 is a fabric that is flexible and flat enough to be shut in the trunk. The stuff bag 56 second end 52 hangs in the trunk, on top of the trunk lid, or on the back of a pickup truck cab and optionally is attached to a weight 54. The opening 68 is preferably an overlapping slit design, where the wall edges 70 and 72 around the opening 68 overlap to cover the opening 68. The wall edge 70 nearer to the stuff bag 56 first end 48 lies over the wall edge 72 nearer to the second end 52, and the side of stuff bag 56 with opening 68 lies facing down, so that when the stuff bag 56 is lying on the vehicle, rain and other precipitation does not run into the opening 68 when it runs off the stuff bag 56 going from the first end 48 toward the second end 52. Once the vehicle top cover 10 is removed from the vehicle, the stuff bag 56 is turned interior surface 60 out, putting the seam joining the rear edge 20 and the exterior surface 62 inside the stuff bag 56. The roof panel 12 and side panels 14 and 16 are then stuffed into the stuff bag 56 for storage, as shown in FIGS. 4A and 4B. A stuff bag 56 approximately 8 inches wide by 12 inches long works well for a mid-sized automotive vehicle top cover 10.

Optionally, the weight 56 may be attached to the rear edge 20 by attachment means other than a flap 46 or stuff bag 56. For example, the attachment means could be short ties that do not reach into the trunk, a fabric pocket stitches that sew a sinker-style weight 56 to the roof panel 12 fabric.

The vehicle top cover 10 is preferably made of a flexible, but fairly inelastic, material. The flexibility lets the vehicle top cover 10 bend to form the vehicle-top shape and to close in the doors and the trunk, while the inelasticity keeps the vehicle top cover 10 from being easily stretched and lifted off of the front and back windows. A moisture resistant fabric that dries readily is preferred. The side panels 14 and 16 and flap 46 or stuff bag 56 should be non-wicking material, so that they do not wick water into the vehicle interior or trunk interior. Optionally, a reflective material may be used to aid in sun reflection.

While there is shown and described the present preferred embodiment of the invention, it is to be distinctly understood that this invention is not limited thereto but may be variously embodied to practice within the scope of the following claims.

I claim:

1. A vehicle top cover for a vehicle including a roof with two opposing shoulders, a front window, a rear window, side windows, windshield wipers, doors, door frames, trunk lid, lid frame, truck interior, and vehicle interior, the vehicle top cover comprising:

a roof panel for placement on top of the vehicle for covering the middle part of the front window, rear window, and part of the roof, the roof panel not covering the shoulder of the roof and the side portions of the front and rear windows, and having a front edge for extending to the bottom of the front window and lying underneath the windshield wipers, a rear edge for extending to the bottom of the rear window, and two side edges for extending toward but not covering the shoulders of the roof, two flexible side panels, each having a seam edge and an opposing hanging edge, said seam edge attached along its entire length to a respective side edge of the roof panel, and each side panel extending from the roof panel for covering a respective opposing roof shoulder and the respective side portions of the front and rear windows, and being closed in between the vehicle doors and door frames to hang substantially inside the vehicle interior with the hanging edge reaching to the bottom of the side windows, and a flexible flap attached to the rear edge of the roof panel for being closed in between the trunk lid and the lid frame to hold the rear edge in place on the vehicle, the flap having a first end, a center portion, and a second end, the first end attached to the rear edge, the center portion for being closed in between the trunk lid and the lid frame, and the second end for hanging inside the trunk interior.

2. A vehicle top cover as set forth in claim 1, further comprising a weight attached to the said second end of the flap.

3. A vehicle top cover as set forth in claim 1, further comprising tie means attached to the front edge of the vehicle top cover for fastening the front edge to the windshield wipers.

4. A vehicle top cover for a vehicle, including a roof with two opposing shoulders, a front window, a rear window, side windows, windshield wipers, doors, door frames, trunk lid, lid frame, trunk interior and vehicle interior, the vehicle top cover comprising:

a roof panel for placement on top of the vehicle for covering the middle part of the front window, rear window, and part of the roof, the roof panel not covering the shoulder of the roof and the side portions of the front and rear windows, and having a front edge for extending to the bottom of the front window and lying underneath the windshield wipers, a rear edge for extending to the bottom of the rear window, and two side edges for extending toward but not covering the shoulders of the roof, two flexible side panels, each having a seam edge and an opposing hanging edge, said seam edge attached along its entire length to a respective side edge of the roof panel, and each side panel extending from the roof panel for covering a respective opposing roof shoulder and the respective side portions of the front and rear windows, and being closed in between the vehicle doors and door frames to hang substantially inside the vehicle interior with the hanging edge reaching to the bottom of the side windows, a weight for holding the rear edge in place near the bottom of the rear window, and an attachment means connecting the weight to the rear edge of the roof panel.

5. A vehicle top cover as set forth in claim 3, further comprising tie means attached to the front edge of the vehicle top cover for fastening the front edge to the windshield wipers.

6. A vehicle top cover for a vehicle, including a roof with two opposing shoulders, a front window, a rear window, side windows, windshield wipers, doors, door frames, trunk lid, lid frame, trunk interior, and vehicle interior, the vehicle top cover comprising:

a roof panel for placement on top of the vehicle for covering the middle part of the front window, rear window, and part of the roof, the roof panel not covering the shoulder of the roof and the side portions of the front and rear windows, and having a front edge for extending to the bottom of the front window and lying underneath the windshield wipers, a rear edge for extending to the bottom of the rear window, and two side edges for extending toward but not covering the shoulders of the roof, two flexible side panels, each having a seam edge and an opposing hanging edge, said seam edge attached along its entire length to a respective side edge of the roof panel, and each side panel extending from the roof panel for covering a respective opposing roof shoulder and the respective side portions of the front and rear windows, and being closed in between the vehicle doors and door frames to hang substantially inside the vehicle interior with the hanging edge reaching to the bottom of the side windows, and a stuff bag defined by an enclosure wall having an exterior surface, an interior surface, a first and second end, an opening, and wall edges around the opening that overlap for preventing rain and snow from entering the stuff bag through the opening, the first end of the stuff bag attached at the exterior surface to the rear edge of the vehicle top cover, the second end for hanging in the trunk interior, and the enclosure wall made flexible for collapsing to a flat shape and being closed in between the trunk lid and lid frame to hold the rear edge in place on the vehicle and the enclosure made flexible for being turned interior-surface-out and receiving the vehicle top cover when not in use on the vehicle.

7. A vehicle top cover as set forth in claim 6, further comprising a weight attached to the second end of the stuff bag.

8. A vehicle top cover as set forth in claim 6, further comprising tie means attached to the front edge of the vehicle top cover for fastening the front edge to the windshield wipers.

* * * * *